STABILIZING APPARATUS FOR A THIN FLEXIBLE MEMBER

Filed Jan. 2, 1968

INVENTORS.
ROBERT F. Mc CAMMON
DARRELL D. PARKER
BY
M. Michael Carpenter
ATTORNEY.

United States Patent Office 3,465,938

Patented Sept. 9, 1969

3,465,938

STABILIZING APPARATUS FOR A THIN FLEXIBLE MEMBER

Robert F. McCammon and Darrell D. Parker, Denver County, Colo., assignors to Honeywell Inc., Minneapolis, Minn., a corporation of Minnesota Filed Jan. 2, 1968, Ser. No. 695,157
Int. Cl. B65h 23/34, 17/32
U.S. Cl. 226—88 2 Claims

ABSTRACT OF THE DISCLOSURE

A vacuum column or tape bin for edge guiding magnetic tape having side walls inwardly sloped for affecting the tape as it travels through the vacuum column by urging the tape against the base and cover of the column.

The present invention relates to a stabilizing apparatus for a thin flexible member and, more particularly, to a vacuum column arranged for edge guiding a thin flexible member therethrough while preventing the member from oscillating, vibrating within the audible frequency range, or skewing.

The utilization of a thin flexible member, such as magnetic tape, for the storage of analog or digital information thereon is well known in the art. The developer of a present day analog system is continuously striving to increase the frequency range which may be recorded upon a magnetic tape. In achieving this increased recording capability, one parameter of the tape system which may be adjusted is the speed at which the magnetic tape is drawn across the recording transducer, or magnetic head. However, as the tape speed is increased the problems of tape guiding and tape handling are complicated. Conversely, in a present day digital system, it is often desirable to operate the system through successive starting, stopping, and restarting operations which may occur at intervals of a few milliseconds or less. In this type of system it is often desirable to decrease the access time to information stored upon the magnetic tape, thus necessitating faster acceleration and deceleration of the magnetic tape. The accelerating and decelerating of the magnetic tape produces many troublesome problems for the designer of the digital system. Thus, the designer of a high speed, complex magnetic tape system frequently turns to the utilization of vacuum columns for providing stable magnetic tape guiding. The vacuum column is typically arranged between the reels which store the magnetic tape and the magnetic heads, where the column acts to isolate reel disturbances from the head area. In prior art machines, the vacuum column has served sufficiently as a buffer system between the reel and magnetic head area. However, as the demand increases for higher speed machines capable of quickly accelerating and decelerating the tape, the vacuum column itself becomes a creator of unwanted tape disturbances. These disturbances, in turn, limit the maximum performance of a magnetic tape system. At higher tape speeds the vacuum column loses its effectiveness as a tape guiding arrangement. Further, a high speed tape moving through a vacuum column often undergoes two degrees of oscillation. This oscillation can cause such undesirable characteristics as tape skew, wow and flutter, tape wear, and audible noise. Tape skew, tape wear, and wow and flutter are detrimental to the operation of the magnetic tape system. The audible noise is detrimental to the operator and without operator acceptance even the best technical machine becomes undesirable.

Accordingly, it is an object of the present invention to provide an improved vacuum column for manipulating a thin flexible member.

Another object of the present invention is to provide a vacuum column arrangement which is capable of edge guiding a thin flexible member therethrough in an improved stable manner.

Still another object of the present invention is to provide a vacuum column which is arranged for eliminating disturbances within a thin flexible member as it is guided therethrough, thereby eliminating vibration, oscillation, and the audio disturbances established thereby.

A further object of the invention presented herein is to provide a vacuum column guiding system which is capable of urging the thin flexible member being guided therethrough against a referenced surface for producing improved guiding reliability and thus eliminating skewing of the thin flexible member.

A still further object of the present invention is to provide a vacuum column which operates efficiently for guiding a thin flexible member therethrough and eliminates the oscillatory motion of that flexible member independently of the length of the member within the column or the speed at which the member is traveling therethrough.

Another further object of the invention presents a vacuum column which provides tension control within a thin flexible member passing therethrough by removing tensional disturbances within the incoming thin flexible member before that member exists therefrom and by arranging the vacuum column to present the establishment of new disturbances therein.

In accomplishing these and other objects, there has been provided a vacuum column having enclosure members including cover, base and side members wherein the side members are arranged for providing suitable dynamic stiffening of a thin flexible member passing therethrough.

Other objects and many of the attendant advantages of the present invention will become readily apparent to those skilled in the art as a better understanding of the present invention is obtained by reference to the following detailed description when considered in connection with the accompanying drawings, wherein.

Figures 1, 2, 3:
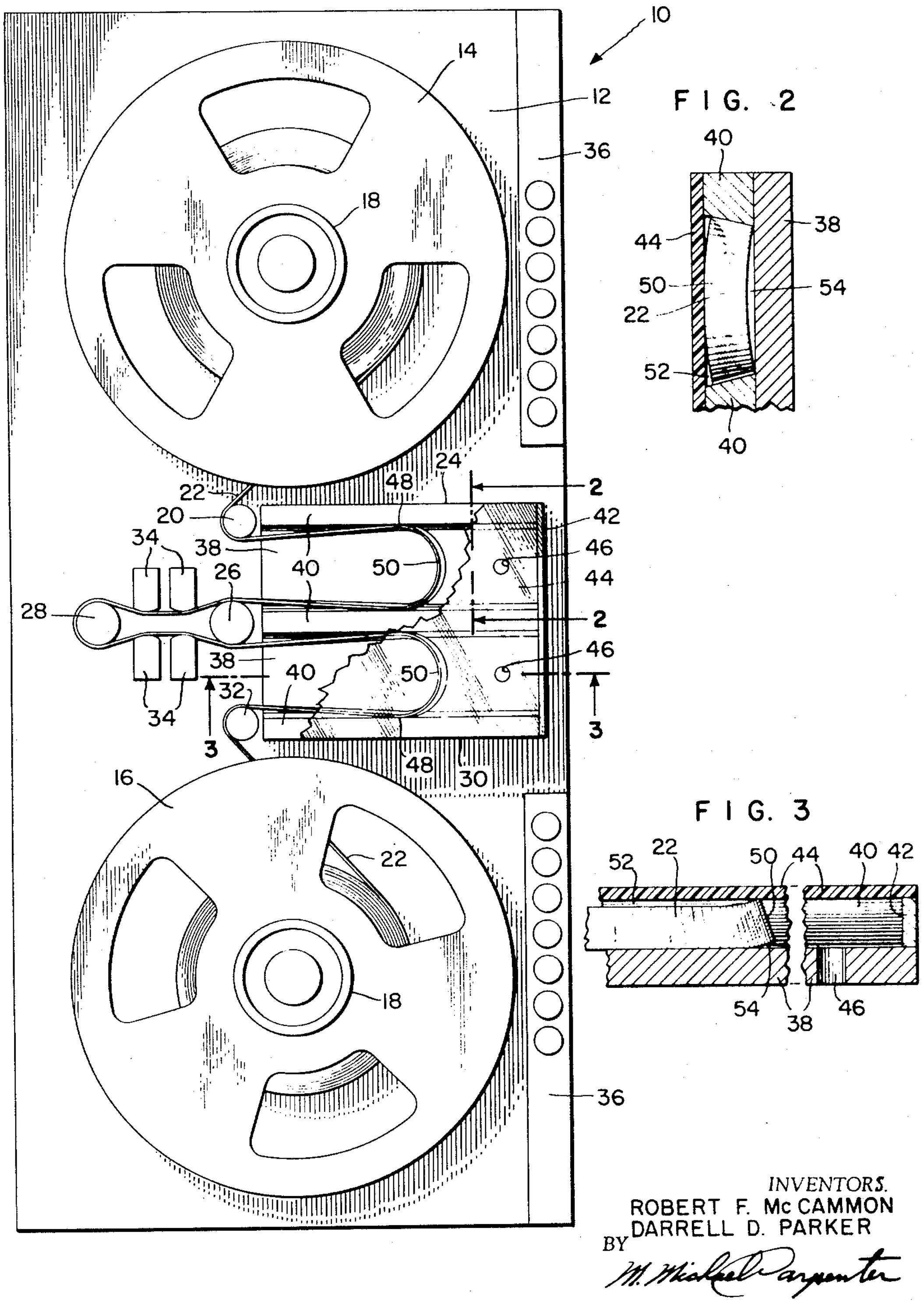
FIG. 1 is a front elevational view of a magnetic tape system utilizing the vacuum column of the present invention.
FIG. 2 is a sectional view taken along line 2—2 of FIG. 1, showing the vacuum column of the present invention in a sectional side elevation.
FIG. 3 is a sectional view taken along line 3—3 of FIG. 1, also showing the vacuum column in a sectional elevation along an axis at right angles to the sectional view of FIG. 2.

Referring now to the drawings, and more particularly to FIG. 1, a magnetic tape system is shown generally at 10 including a main frame mounting plate 12 to which supply and takeup reels, 14 and 16, are mounted. Each reel is mounted by a suitable mounting hub 18 which is secured to the shaft of a drive motor, not shown. A first idler roller 20 is provided for guiding a thin flexible member 22, such as magnetic tape, from the supply reel 14 into a first vacuum column 24. As the magnetic tape 22 exits the first vacuum 24, it passes over a damping roller 26 and into the recording area of the magnetic tape system 10. The tape then wraps about a capstan 28 and returns across the damping roller 26 to enter a second vaccum column 30. As the magnetic tape 22 exits the second vacuum column 30, it wraps about a second idler roller 32 before being wound upon the take up reel 16. In this present invention, the recording area contains four magnetic transducers 34 including a pair of magnetic recording heads and a pair of magnetic reproducing heads. The magnetic tape system is controlled, in a known manner, by control means mounted on control panels 36. While the present invention is described and utilized within a magnetic tape system similar to that described hereinabove, it should be understood that the vacuum column of the present invention is not limited in its application to this system; and that the vacuum column of the present invention may be advantageously utilized within many similar systems.

The vacuum columns 24 and 30 are each constructed from a base member 38 which, in the present embodiment, is formed from a single piece of material having its tape contacting surface machined to a smooth finish and dimensioned from the mounting plate 12 to provide a reference edge guiding surface for the magnetic tape 22. Each vacuum column includes a pair of side wall members 40, FIG. 2, which extend upwardly from the base member 38 and are attached thereto, as by screws, not shown. A rear wall member 42 is arranged between the side wall member 40 for completing the perimeter of the vacuum column. A cover plate 44 rests upon the side wall members 40 and rear wall member 42 for enclosing the vacuum column. The cover plate 44 is attached in a conventional manner, as by screws, not shown. As best seen in FIG. 2, each side wall member 40 has a cross section which is wider at its base than its top and which narrows uniformly from the base toward the top for forming a sloped inner surface that contacts the magnetic tape. A vacuum port 46 is provided in the base member 38 within each vacuum column, 24 and 32, at the lower or right-hand end thereof. A vacuum source, not shown, provides a negative pressure on one side of the tape which counteracts with the ambient atmospheric pressure on the other side of the tape for pulling the magnetic tape 22 into the vacuum column. The differential air pressure thus formed acts on the magnetic tape 22 moving through the vacuum column for pushing the magnetic tape against the sloped surface of the side wall members 40, at 48, thus causing the tape to turn a circular arc 50 across the width of the vacuum column opening.

If the vacuum column had straight side walls, as in most prior art devices, the differential air pressure on the tape would cause the tape to move as if it were turning about a cylinder. The diameter of this cylinder would equal the width of the vacuum column opening. The vacuum column utilizing straight sides fails to precisely guide the magnetic tape 22 due to the necessary dimensional clearance 52 between the edge of the tape and the inner surface of the vacuum column. In a system with straight sides, there is no action or reaction to prevent the tape from oscillating within this clearance space. The clearance 52 is increased still further due to the presence of manufacturing tolerances in both the magnetic tape 22 and the vacuum columns, 24 and 30. This arrangement allows the tape to vibrate laterally within the clearance for causing degradation of performance during the recording and reproducing operations of the magnetic tape system. Further, due to the clearance space, the movement of air past the vibrating tape edges often produces disturbances capable of emitting audible sound in a manner similar to a loud speaker.

The sloped inner surface of the side wall members 40 form an opening having a trapezoidal shape. The differential air pressure acting on the tape pushes the tape against the sloped inner sides of these walls as shown in FIG. 2. As the magnetic tape 22 contacts the sloped side and departs therefrom to turn across a width of a vacuum column, the differential air pressure acting on the tape causes it to turn an arc having two different diameters corresponding to the longer base and the shorter base of the trapezoidal opening. The length of the magnetic tape between its contact with one sloped inner surface and its contact with the opposite sloped inner surface is obviously the same. Thus, since the upper edge has to follow a larger diameter while the lower edge follows a smaller diameter, the tape acts as if it is being turned on a conically shaped turning element. If the tape were free to lift on this imaginary conical surface, without the limiting force applied by the cover plate 42, the arc formed by the turning tape would be nearly circular. However, due to the restriction of the cover plate 42, the tape is restrained thereby and forced to follow a flatter arcuate path. It is well known that for every acting force there is an equal and opposite reacting force, Newton's third law of motion. Thus, the magnetic tape contacting the cover plate 40 causes the opposite edge of the tape to be forced down against the guiding surface of the base member 38. The tape is retained in this position by the continuous forcing of the tape against the sloped inner surfaces of the side walls 40 at the point 48. Thus, an opening 54 is established across the lowermost portion of the tape as it turns across the bottom of the vacuum column. This configuration allows a controlled amount of air to pass into the vacuum system, not shown, and urges the tape against both the base and cover of the vacuum column for preventing oscillation and vibration which could otherwise cause noise in the audible frequency range. Due to the urging action of the sloped inner surfaces, the magnetic tape is retained against the edge guiding surface of the base member 38 as it exits the vacuum column for providing edge guiding and eliminating skew therein. Further, the imaginary conical surface causes the tape to buckle for producing a dynamic stiffening within the moving tape and thus eliminating lateral and longitudinal oscillation therein.

The dynamic stiffening and oscillation elimination described hereinabove occurs whether the magnetic tape 22 is moving in a forward or rewind direction. This result is also independent of the tape thickness, material of the tape, or the width of the tape. Further, the action is unaffected by the speed at which the tape is moving and is not a function of the differential air pressure of the vacuum system. Vacuum is required, however, to develop the differential air pressure necessary to stiffen the thin flexible tape so that the tape can be moved through the vacuum column free of tensional disturbances therein. The system is also independent of the amount of tape within the vacuum column.

While the vacuum column has been individually described, it should be noted that the illustration shows a pair of tapered columns having a common side therebetween. The scope of this invention is not intended to be limited to such a dual vacuum column arrangement, nor is it intended to be limited to a single vacuum column arrangement. Further, the sloped surfaces of the side walls may be sloped in either direction and there is no limitation intended by the showing in FIG. 2 wherein the sloped walls form an increasingly wider opening as one moves away from the base member 38. Obviously, this sloped or tapered arrangement could be reversed without departing from the scope of the present invention.

Therefore, it should be understood, that further modifications and variations of the present invention will become apparent to those skilled in the art, in light of the above teachings, and it should be further understood that the embodiments described hereinabove are illustrations rather than limitations of the scope of the present invention.

The embodiments of the invention in which an exclusive property or privilege is claimed are defined as follows:

1. A vacuum column for manipulating a thin flexible member as it passes therethrough, comprising:
   - base means arranged for providing an edge guiding reference surface,
   - side and rear means forming a perimeter about said base means,
   - cover means enclosing said vacuum column,
   - means for removing air from said enclosed vacuum column,
   - said side means including a contacting surface arranged for distorting the thin flexible member at its point of of contact therewith thus urging said thin flexible member against said cover means as said thin flexible member passes thereacross between said side means, said side means and said cover means arranged for forcing said thin flexible member against said edge guiding reference surface of said base means thus providing a vacuum column for edge guiding and manipulating said thin flexible member without creating vibrational disturbances therein.

2. A vacuum column for manipulating a thin flexible member as it passes therethrough, comprising:

base means arranged for providing an edge guiding reference surface, first and second side means having a sloped inwardly directed surface arranged for contacting the thin flexible member, third side means arranged between said first and second side means for forming a perimeter about said base means, cover means enclosing said vacuum column and forming an opening therein having a width greater than said thin flexible member, means for removing air from said enclosed vacuum column thereby urging said thin flexible member against said sloped inwardly directed surfaces of said first and second side means, said sloped inwardly directed surfaces arranged for distorting said thin flexible member and urging said member against said cover means as said member passes thereacross between said first and second side means;

said sloped inwardly directed surfaces of said first and second side means combining with said cover means for urging said thin flexible member against said edge guiding reference surface before and after said member contacts said first and second side means, whereby said vacuum column having a wider opening than said thin flexible member edge guides said thin flexible member for preventing vibrational disturbances therein.

References Cited

UNITED STATES PATENTS 2,970,732 2/1961 Lawrance et al. ---- 226—197 X

ALLEN N. KNOWLES, Primary Examiner

U.S. Cl. X.R.

226—97

UNITED STATES PATENT OFFICE

CERTIFICATE OF CORRECTION

Patent No. 3,465,938 September 9, 1969

Robert F. McCammon et al.

It is certified that error appears in the above identified patent and that said Letters Patent are hereby corrected as shown below:

In the heading to the printed specification, line 6, "Minnesota" should read -- Delaware --.

Signed and sealed this 11th day of August 1970.

(SEAL)
Attest:

Edward M. Fletcher, Jr.
Attesting Officer

WILLIAM E. SCHUYLER, JR.
Commissioner of Patents